United States Patent
Oh et al.

(10) Patent No.: US 11,869,383 B2
(45) Date of Patent: Jan. 9, 2024

(54) METHOD, SYSTEM AND NON-TRANSITORY COMPUTER-READABLE RECORDING MEDIUM FOR PROVIDING INFORMATION ON USER'S CONCEPTUAL UNDERSTANDING

(71) Applicant: VITRUV INC., Seoul (KR)

(72) Inventors: Tae Hyoung Oh, Seoul (KR); Myunghoon Ahn, Seoul (KR); Du Seop Jung, Seongnam-si (KR); Sang Hoon Lee, Seoul (KR); Jaehyeong Ahn, Bucheon-si (KR)

(73) Assignee: VITRUV INC., Seoul (KR)

( * ) Notice: Subject to any disclaimer, the term of this patent is extended or adjusted under 35 U.S.C. 154(b) by 0 days.

(21) Appl. No.: 18/100,699

(22) Filed: Jan. 24, 2023

(65) Prior Publication Data
US 2023/0245578 A1 Aug. 3, 2023

(30) Foreign Application Priority Data

Jan. 24, 2022 (KR) .................. 10-2022-0010307

(51) Int. Cl.
*G09B 5/02* (2006.01)
*G09B 7/00* (2006.01)

(52) U.S. Cl.
CPC . *G09B 5/02* (2013.01); *G09B 7/00* (2013.01)

(58) Field of Classification Search
CPC .................... G09B 5/02; G09B 7/00
See application file for complete search history.

(56) References Cited

U.S. PATENT DOCUMENTS

| | | | |
|---|---|---|---|
| 2012/0077158 A1* | 3/2012 | Jastrzembski | G09B 7/00 434/219 |
| 2013/0224699 A1* | 8/2013 | Jastrzembski | G09B 7/00 434/219 |
| 2015/0170536 A1* | 6/2015 | Lan | G09B 7/02 434/350 |
| 2023/0100924 A1* | 3/2023 | Tamano | G09B 7/04 434/350 |
| 2023/0103617 A1* | 4/2023 | Choi | G09B 7/077 434/350 |
| 2023/0138245 A1* | 5/2023 | Tamano | G09B 5/02 |

FOREIGN PATENT DOCUMENTS

| | | |
|---|---|---|
| KR | 1020190082645 A | 7/2019 |
| KR | 1020190118815 A | 10/2019 |
| KR | 1020210019380 A | 2/2021 |

* cited by examiner

*Primary Examiner* — Eddy Saint-Vil
(74) *Attorney, Agent, or Firm* — Dinsmore & Shohl LLP; Yongsok Choi, Esq.

(57) ABSTRACT

A method for providing information on a user's concept understanding is provided. The method includes the steps of: acquiring a set of data on a user's concept understanding estimated using a concept-specific understanding estimation model that is trained on the basis of concept-specific correctness/incorrectness sequence data; and visualizing the user's understanding of at least one of concepts included in the acquired data set.

7 Claims, 4 Drawing Sheets

METHOD, SYSTEM AND NON-TRANSITORY COMPUTER-READABLE RECORDING MEDIUM FOR PROVIDING INFORMATION ON USER'S CONCEPTUAL UNDERSTANDING

CROSS-REFERENCE TO RELATED APPLICATION

This application claims priority to Korean Patent Application No. 10-2022-0010307 filed on Jan. 24, 2022, the entire contents of which are herein incorporated by reference.

FIELD OF THE INVENTION

The present invention relates to a method, system, and non-transitory computer-readable recording medium for providing information on a user's concept understanding.

BACKGROUND

The educational environment is changing rapidly due to various changes in the surrounding environment caused by the utilization of the Internet and computers. Further, the educational content market is gradually growing due to educational fervor and fierce competition for entrance examinations.

Meanwhile, with the development of artificial intelligence technology, various learning contents and application techniques that support a user's learning based on the artificial intelligence technology are being developed and released as methods of supplementing the user's insufficient knowledge, departing from the traditional methods of providing learning solutions based on the knowledge or know-how of instructors or educational institutions.

As an example of the related conventional techniques, a technique has been introduced which provides a learning material including one or more question sections, an answer sheet including solutions and correct answers to one or more questions, and a concept summary section in which concepts for the one or more questions are summarized, wherein the answer sheet includes a correct answer check part for checking whether the answer to each question is correct, a correct answer percentage calculation part for calculating a correct answer percentage for each question, and other parts related to frequencies of questions.

As another example of the related conventional techniques, a learning system has been introduced in which a user's knowledge level is inferred through a learning diagnosis based on artificial intelligence, and learning is carried out at a difficulty level according to the knowledge level.

However, according to the techniques introduced so far as well as the above-described conventional techniques, a learning concept required to solve a learning question provided to a user who carries out learning, a type of the learning question (e.g., a basic question or an advanced question), and the like are provided as a package equally to each user, without considering the learning situation or learning context of the user, so that it is difficult to recognize, for example, which learning concept the user lacks with respect to the learning question or whether the type of the learning question is appropriate for the user (e.g., whether the question should be considered as a basic question or an advanced question in view of the user's knowledge). That is, there occurs a problem that the user's learning efficiency is reduced because the user's learning is carried out without adequate consideration of the user's degree of knowledge and concept acquisition.

SUMMARY OF THE INVENTION

One object of the present invention is to solve all the above-described problems in the prior art.

Another object of the invention is to generate concept-specific correctness/incorrectness sequence data with reference to data on a result of solving learning questions provided to a user, thereby building a concept understanding estimation model that reflects time-based weights and learning experiences of multiple users with respect to concepts, and using the model to estimate the user's understanding of each concept.

Yet another object of the invention is to increase the efficiency of learning by providing a visualization of a user's understanding of a specific concept over time so that the user may easily recognize the need of learning the specific concept.

Still another object of the invention is to remind a user of a concept that requires supplemental learning by specifying a relationship between at least two concepts and providing a structural visualization of the user's understanding of the at least two concepts.

The representative configurations of the invention to achieve the above objects are described below.

According to one aspect of the invention, there is provided a method for providing information on a user's concept understanding, the method comprising the steps of: acquiring a set of data on a user's concept understanding estimated using a concept-specific understanding estimation model that is trained on the basis of concept-specific correctness/incorrectness sequence data; and visualizing the user's understanding of at least one of concepts included in the acquired data set.

According to another aspect of the invention, there is provided a system for providing information on a user's concept understanding, the system comprising: a data acquisition unit configured to acquire a set of data on a user's concept understanding estimated using a concept-specific understanding estimation model that is trained on the basis of concept-specific correctness/incorrectness sequence data; and a concept understanding provision unit configured to visualize the user's understanding of at least one of concepts included in the acquired data set.

In addition, there are further provided other methods and systems to implement the invention, as well as non-transitory computer-readable recording media having stored thereon computer programs for executing the methods.

According to the invention, it is possible to generate concept-specific correctness/incorrectness sequence data with reference to data on a result of solving learning questions provided to a user, thereby building a concept understanding estimation model that reflects time-based weights and learning experiences of multiple users with respect to concepts, and using the model to estimate the user's understanding of each concept.

According to the invention, it is possible to increase the efficiency of learning by providing a visualization of a user's understanding of a specific concept over time so that the user may easily recognize the need of learning the specific concept.

According to the invention, it is possible to remind a user of a concept that requires supplemental learning by specifying a relationship between at least two concepts and providing a structural visualization of the user's understanding of the at least two concepts.

DETAILED DESCRIPTION OF THE INVENTION

Figure 1:
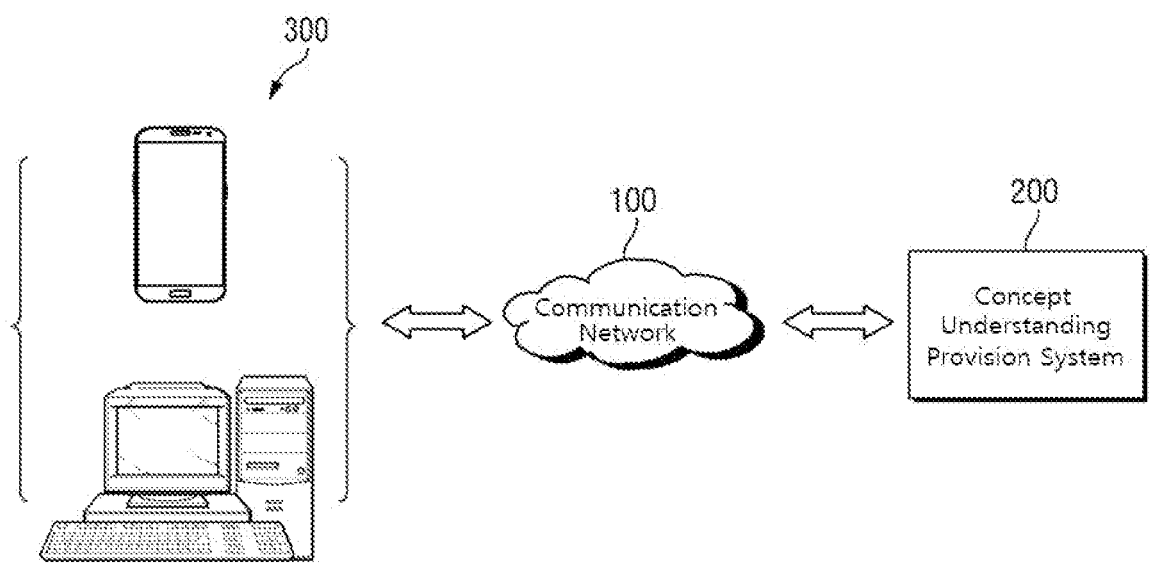
FIG. 1 schematically shows the configuration of an entire system for providing information on a user's concept understanding according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Herein, the term "content" or "contents" encompasses digital information or individual information elements comprised of text, symbol, speech, sound, image, video, and the like, which are accessible via communication networks. For example, such contents may comprise data such as text, image, video, audio, and links (e.g., web links) or a combination of at least two types of such data.

Herein, sequence data may refer to a series of interrelated pieces of data. For example, the sequence data may refer to time-series data, which is data recorded over time, and text data, which has a contextual order over time. Specifically, the sequence data may include first sequence data generated at a first time point and second sequence data generated at a second time point that follows the first time point by a predetermined amount of time. Further, according to one embodiment of the invention, the sequence data may contribute to predicting a probability distribution of future occurrences of data.

Herein, a concept may refer to a unit of knowledge required to understand or solve a learning question. For example, the knowledge unit or learning concept may encompass a table of contents, a curriculum unit, and the like in a curriculum.

Herein, a question may refer to a problem associated with at least one concept. The question according to one embodiment of the invention may include not only a conventional basic question provided to acquire a learning concept, but also a supplemental question that may be additionally provided together with the basic question on the basis of the user's understanding of the concept. For example, according to one embodiment of the invention, the types of the supplemental question may include a "concept-as-is" question that utilizes a single learning concept in which the user is determined to be weak, a "concept-plus" question that utilizes a learning concept different from a learning concept in which the user is determined to be weak, and the like.

Configuration of the Entire System

FIG. 1 schematically shows the configuration of the entire system for estimating concept understanding according to one embodiment of the invention.

As shown in FIG. 1, the entire system according to one embodiment of the invention may comprise a communication network 100, a concept understanding provision system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi Direct communication, Long Term Evolution (LTE) communication, Bluetooth communication (e.g., Bluetooth Low Energy (BLE) communication), infrared communication, and ultrasonic communication.

Next, the concept understanding provision system 200 according to one embodiment of the invention may communicate with the device 300 to be described below via the communication network 100, and may function to acquire a set of data on a user's concept understanding estimated using a concept-specific understanding estimation model that is trained on the basis of concept-specific correctness/incorrectness sequence data, and to visualize the user's understanding of at least one of concepts included in the acquired data set.

The configuration and functions of the concept understanding provision system 200 according to the invention will be discussed in more detail below. Meanwhile, the above description is illustrative although the concept understanding provision system 200 has been described as above, and it will be apparent to those skilled in the art that at least a part of the functions or components required for the concept understanding provision system 200 may be implemented or included in the device 300 to be described below or an external system (not shown), as necessary.

Next, the device 300 according to one embodiment of the invention is digital equipment that may function to connect to and then communicate with the concept understanding provision system 200 via the communication network 100, and any type of portable digital equipment having a memory means and a microprocessor for computing capabilities, such as a smart phone and a tablet PC, may be adopted as the device 300 according to the invention.

Meanwhile, the device 300 according to one embodiment of the invention may include an application for supporting the functions of providing concept understanding according to the invention. The application may be downloaded from the concept understanding provision system 200 or an external application distribution server (not shown).

Configuration of the Concept Understanding Provision System

Hereinafter, the internal configuration of the concept understanding provision system 200 crucial for implementing the invention and the functions of the respective components thereof will be discussed.

Figure 2:
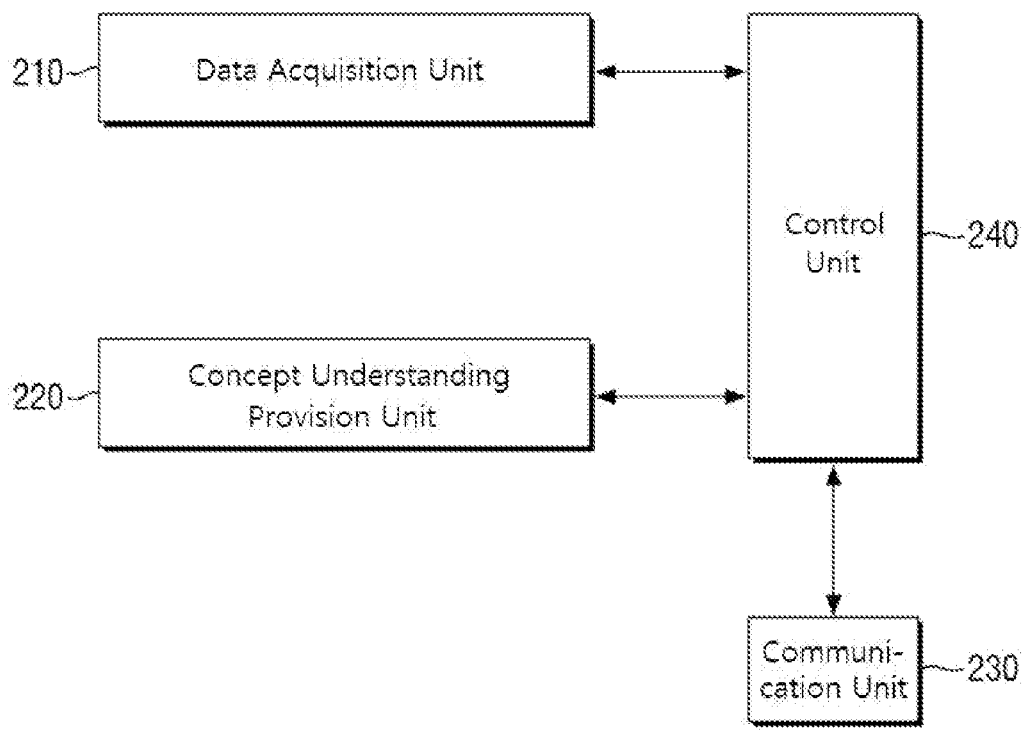
FIG. 2 specifically shows the internal configuration of a concept understanding provision system according to one embodiment of the invention.

FIG. 2 specifically shows the internal configuration of the concept understanding provision system 200 according to one embodiment of the invention.

The concept understanding provision system 200 according to one embodiment of the invention may be digital equipment having a memory means and a microprocessor for computing capabilities. As shown in FIG. 2, the concept understanding provision system 200 may comprise a data acquisition unit 210, a concept understanding provision unit 220, a communication unit 230, and a control unit 240. According to one embodiment of the invention, at least some of the data acquisition unit 210, the concept understanding provision unit 220, the communication unit 230, and the control unit 240 may be program modules that communicate with an external system. The program modules may be included in the concept understanding provision system 200 in the form of operating systems, application program modules, or other program modules, while they may be physically stored in a variety of commonly known storage devices. Further, the program modules may also be stored in a remote storage device that may communicate with the concept understanding provision system 200. Meanwhile, such program modules may include, but are not limited to, routines, subroutines, programs, objects, components, and data structures for performing specific tasks or executing specific abstract data types according to the invention as will be described below.

First, the data acquisition unit 210 according to one embodiment of the invention may acquire a set of data on a user's concept understanding estimated using a concept-specific understanding estimation model that is trained on the basis of concept-specific correctness/incorrectness sequence data.

According to one embodiment of the invention, the concept-specific correctness/incorrectness sequence data may be generated with reference to data on a result of at least one user solving at least one question associated with at least one concept.

Further, according to one embodiment of the invention, the concept-specific correctness/incorrectness sequence data may be generated by preprocessing for performing concept-specific categorization with respect to the data on the result of solving the at least one question associated with the at least one concept.

For example, according to one embodiment of the invention, the concept-specific correctness/incorrectness sequence data may be generated by preprocessing data on a result of solving questions to indicate correctness or incorrectness for each concept included in a question solved in a time-series manner by each user. According to one embodiment of the invention, the concept-specific categorization for the at least one question may be performed on the basis of concept-specific tagging made by an expert in the relevant field. Further, according to another embodiment of the invention, the concept-specific categorization for the at least one question may be performed on the basis of a natural language processing (NLP) algorithm and a clustering algorithm.

Specifically, according to one embodiment of the invention, the concept-specific categorization for the at least one question may be performed by tagging the at least one question by concept with reference to a lookup table that is pre-created by the expert to categorize concepts (e.g., which may refer to a lookup table in which concepts are pre-categorized for each question). Further, according to one embodiment of the invention, the concept-specific categorization for the at least one question may be performed with reference to the lookup table using a NLP algorithm and a clustering algorithm.

Meanwhile, a concept-specific understanding estimation model according to one embodiment of the invention may be trained on the basis of the concept-specific correctness/incorrectness sequence data.

For example, the concept-specific understanding estimation model according to one embodiment of the invention may be trained using a Bayesian knowledge tracing algorithm. Herein, the Bayesian knowledge tracing algorithm may refer to an algorithm that probabilistically models a learner's cognitive processes during the course of learning to trace the learner's level of knowledge acquisition at a given time point.

According to one embodiment of the invention, the concept-specific understanding estimation model may be trained with respect to a plurality of parameters (e.g., pre-existing knowledge, acquired knowledge, a guess, and a mistake) on the basis of the concept-specific correctness/incorrectness sequence data. According to one embodiment of the invention, the pre-existing knowledge indicates a probability that the user already possesses the knowledge, the acquired knowledge indicates a probability that the user fully understands the knowledge by solving a question, the guess indicates a probability that the user guesses a correct answer to the question without possessing the knowledge, and the mistake indicates a probability that the user possesses the knowledge but makes a mistake. Further, according to one embodiment of the invention, the plurality of parameters may be updated on the basis of an expectation maximization algorithm.

According to one embodiment of the invention, the concept-specific understanding estimation model may be trained such that the concept-specific understanding is estimated by assigning a greater weight to second sequence data generated at a second time point (e.g., following a first time point by a predetermined amount of time) than to first sequence data generated at the first time point.

For example, according to one embodiment of the invention, the second sequence data may be assigned a greater weight than the first sequence data on the basis of a weighting function.

More specifically, the weighting function according to one embodiment of the invention may be expressed as Equation 1 below.

$$w_{tl} = \frac{d^{t-l}}{\sum_{l=1}^{t-1} d^{t-l}} \in (0, 1] \qquad \text{(EQ. 1)}$$

Here, $w_{tl}$ denotes a weight assigned to the $l^{th}$ sequence data out of t pieces of sequence data, and d denotes a user-defined constant. For example, d may be set to 0.7. As another example, d may be set to a value that is observed to have the smallest error during the course of assessing the concept-specific understanding estimation model.

This allows the concept-specific understanding estimation model to more precisely estimate the user's concept understanding by assigning a greater weight to more recent sequence data, reflecting the degree of forgetting a concept over time after solving a question.

Further, the conventional Bayesian knowledge tracing algorithm is based on the assumption that a user does not forget knowledge once learned, and has a limitation that individual characteristics (e.g., difficulty) of questions cannot be considered.

According to one embodiment of the invention, the concept-specific understanding estimation model may be trained with respect to the plurality of parameters with reference to the weighted concept-specific correctness/incorrectness sequence data, so that the user's concept understanding may be more precisely identified compared to the conventional Bayesian knowledge tracing algorithm. Meanwhile, the concept-specific understanding estimation model according to the invention is not necessarily limited to being trained by the above algorithm, and the training algorithm may be diversely changed as long as the objects of the invention may be achieved.

According to the invention, a concept understanding estimation model may be built not only using the above concept-specific correctness/incorrectness sequence data, but also using concept-specific correctness/incorrectness sequence data of two or more users so that the model may be applied to the two or more users. Therefore, the concept understanding estimation model may reflect learning experiences of multiple learners, thereby providing concept understanding estimation results with high reliability and universality.

Further, according to one embodiment of the invention, the user's concept understanding may be estimated using a concept-specific understanding estimation model that is trained on the basis of the concept-specific correctness/incorrectness sequence data. Specifically, according to one embodiment of the invention, a user's understanding of a concept (or concept understanding) may refer to a probability that the user knows the concept at a given time point (e.g., at time point t+1) on the basis of the concept-specific correctness/incorrectness sequence data (e.g., the data through time point t).

Further, according to one embodiment of the invention, when a particular user has never solved a question about a specific concept, the user's understanding of the concept may be set to 0.5.

Meanwhile, according to one embodiment of the invention, the user's understanding of a concept that the user has not encountered may be estimated.

For example, according to one embodiment of the invention, a first user's understanding of a second concept may be estimated on the basis of a second user's understanding of the second concept.

More specifically, according to one embodiment of the invention, learning levels of the first user and the second user may be assessed by comparing concept understanding of the first user and the second user with respect to a plurality of concepts that the first user has already encountered. Next, the first user's understanding of the second concept may be estimated on the basis of the assessed learning levels of the first and second users and the second user's concept correctness/incorrectness sequence data for the second concept.

As another example, according to one embodiment of the invention, the user's understanding of a concept that the user has not encountered may be estimated by assessing the similarity between the concept that the user has not encountered and a concept that the user has already solved.

For example, a simulated annealing algorithm may be applied to a first question containing a second concept not encountered by the user and a second question containing a first concept encountered by the user, thereby assessing the similarity between the first and second concepts. According to one embodiment of the invention, on the basis of the assessed similarity between the concepts, the user's understanding of the concept not encountered by the user may be estimated from the user's understanding of the concept encountered by the user.

Meanwhile, according to one embodiment of the invention, the user's understanding of a concept not encountered by the user may be estimated on the basis of a collaborative filtering algorithm.

For example, the user's understanding of the concept not encountered by the user may be estimated using a matrix factorization algorithm on the concept-specific correctness/incorrectness sequence data represented in a matrix structure with respect to a plurality of concepts (e.g., which may be a first concept encountered by the user and a second concept not encountered by the user) and results of a plurality of users solving questions. As another example, since the times at which the concept understanding is estimated for the plurality of users are different, the user's understanding of the concept not encountered by the user may be estimated using a temporal dynamics algorithm.

Further, according to one embodiment of the invention, the concept-specific understanding estimation model may be assessed using a result of estimating the user's concept understanding.

For example, according to one embodiment of the invention, the concept-specific understanding estimation model may be assessed on the basis of a k-fold cross validation algorithm. Specifically, the k-fold cross validation algorithm according to one embodiment of the invention refers to an algorithm for assessing the model by successively alternating training and validation steps, such that all the concept correctness/incorrectness sequence data is assessed. Meanwhile, the concept-specific understanding estimation model according to the invention is not necessarily limited to being assessed by the above algorithm, and the assessment algorithm for optimizing the model may be diversely changed as long as the objects of the invention may be achieved.

Next, the concept understanding provision unit 220 according to one embodiment of the invention may visualize the user's understanding of at least one of concepts included in the acquired data set. Here, the user's understanding according to one embodiment of the invention may be understood to encompass not only the concept understanding estimated using the concept-specific understanding estimation model, but also a value from 0 to 100 calculated on the basis of the concept understanding. Specifically, the user's understanding according to one embodiment of the invention may refer to a value from 0 to 100 calculated with reference to a relative relationship between a concept and a probability that the user knows the concept at a given time point (e.g., at time point t+1) on the basis of the concept-specific correctness/incorrectness sequence data (e.g., the data through time point t).

Meanwhile, the concept understanding provision unit 220 according to one embodiment of the invention may measure the user's understanding of a specific concept at two or more time points, and visualize the user's understanding at the two or more time points over time. Here, the visualization according to one embodiment of the invention may include providing graphical objects (e.g., points, lines, and surfaces) that may represent the user's understanding through visual means (e.g., charts and graphs) on a user interface.

For example, the concept understanding provision unit 220 according to one embodiment of the invention may represent changes in the user's understanding of a specific concept from a first time point (e.g., time point t) to a $n^{th}$ time point (e.g., time point t+n) via a curve graph connecting the concept understanding at each time point (e.g., t, t+1, t+2, . . . , t+n).

Further, the concept understanding provision unit 220 according to one embodiment of the invention may specify a relationship between at least two concepts and visualize the user's understanding of the at least two concepts on the basis of the relationship.

Specifically, according to one embodiment of the invention, a relationship between concepts (e.g., a superordinate-subordinate relationship, an analogous relationship, a dependent relationship, or a causal relationship) may be specified on the basis of concept-specific tagging made by an expert, and the user's understanding may be visualized by assigning a weight on the basis of the specified relationship. According to one embodiment of the invention, when a relationship between a first concept and a second concept is an analogous relationship, and the user's understanding of the first concept is 100, the user's understanding of the second concept may be calculated by assigning a weight to the understanding of the second concept, so as to be determined and visualized as being greater than a reference value of the understanding of the second concept (i.e., a value calculated by multiplying the understanding of the second concept by 100).

Next, the communication unit 230 according to one embodiment of the invention may function to enable data transmission/reception from/to the data acquisition unit 210 and the concept understanding provision unit 220.

Lastly, the control unit 240 according to one embodiment of the invention may function to control data flow among the data acquisition unit 210, the concept understanding provision unit 220, and the communication unit 230. That is, the control unit 240 according to the invention may control data flow into/out of the concept understanding provision system 200 or data flow among the respective components of the concept understanding provision system 200, such that the data acquisition unit 210, the concept understanding provision unit 220, and the communication unit 230 may carry out their particular functions, respectively.

Figure 3:
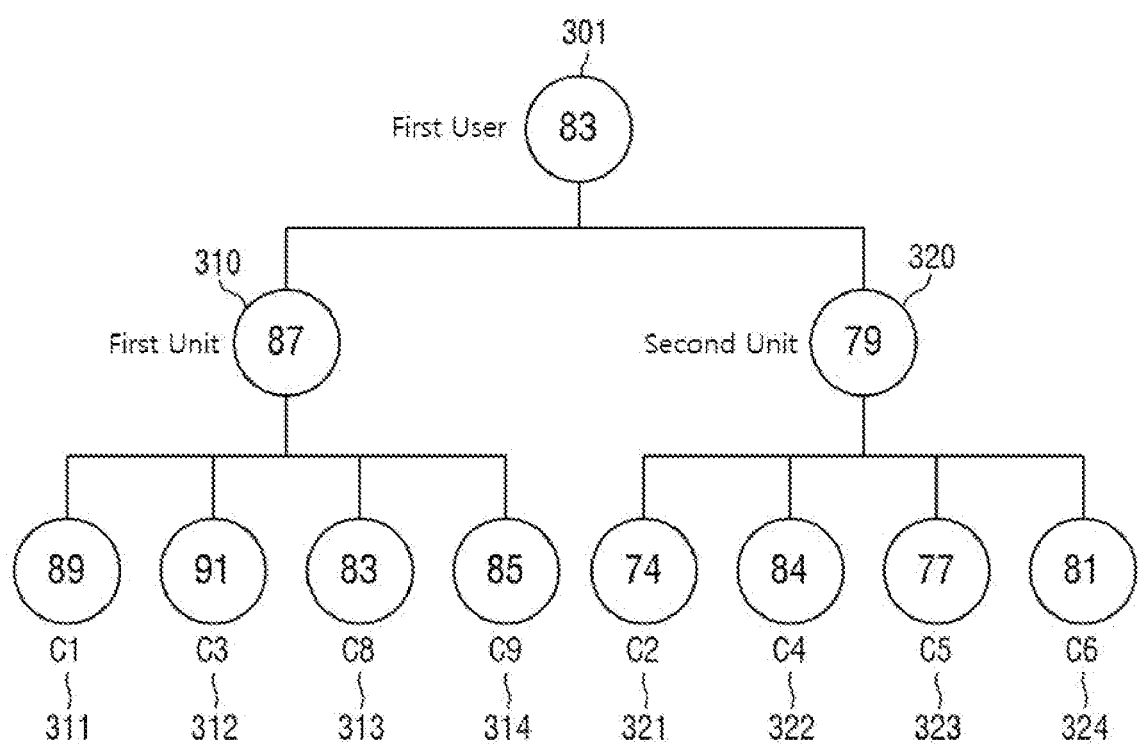
FIG. 3 illustratively shows how to structurally visualize a user's concept understanding or dynamically visualize the user's concept understanding over time according to one embodiment of the invention.
Figure 4:
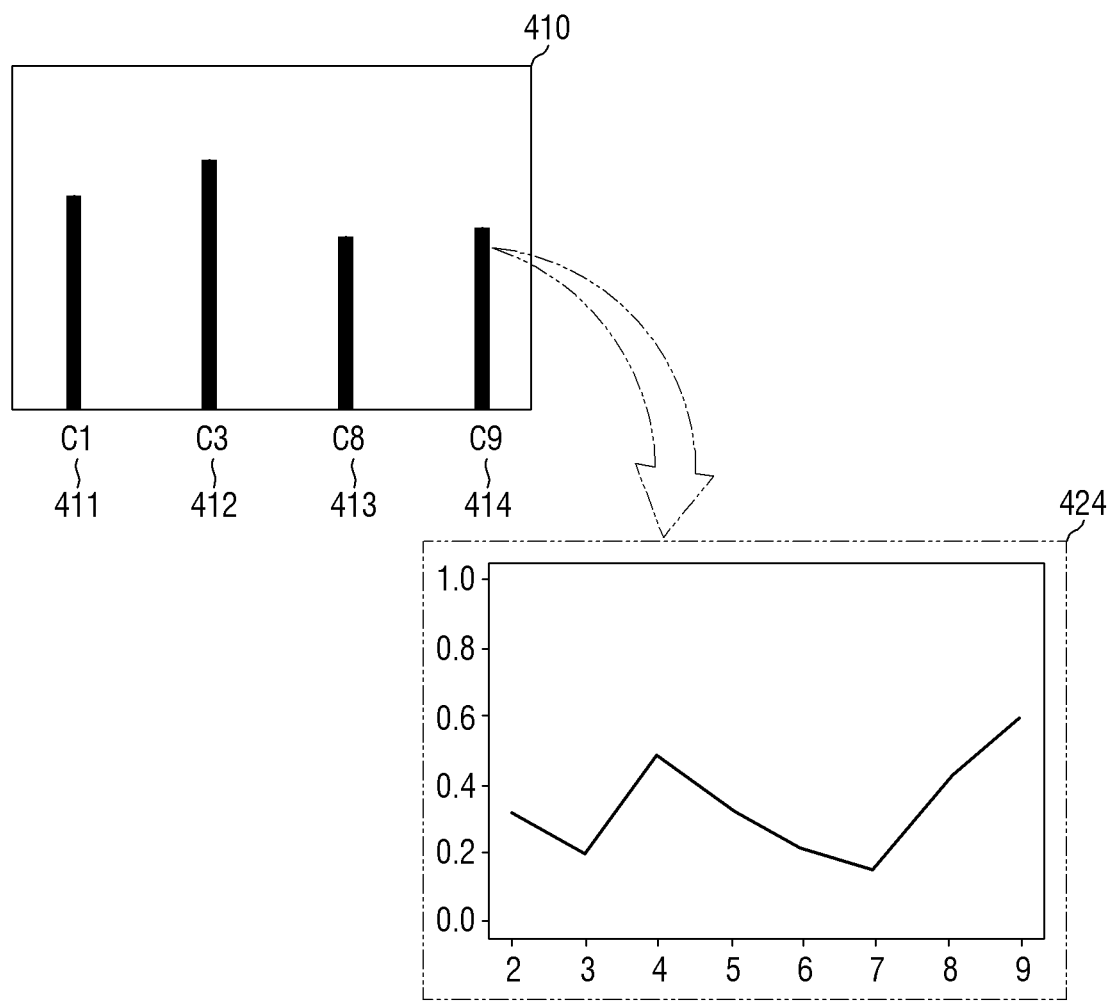
FIG. 4 illustratively shows how to structurally visualize a user's concept understanding or dynamically visualize the user's concept understanding over time according to one embodiment of the invention.

FIGS. 3 and 4 illustratively show how to structurally visualize a user's concept understanding or dynamically visualize the user's concept understanding over time according to one embodiment of the invention.

Referring to FIG. 3, according to one embodiment of the invention, it may be assumed that a first user's learning course 301 comprises a first unit 310 and a second unit 320, wherein the first unit 310 comprises concepts C1 311, C3 312, C8 313, and C9 314, and the second unit 320 comprises concepts C2 312, C4 322, C5 323, and C6 324.

According to one embodiment of the invention, the first user's understanding of the plurality of concepts may be represented by a value from 0 to 100. For example, the first user's understanding of C1 311 may be represented as 89, the first user's understanding of C3 312 may be represented as 91, the first user's understanding of C8 313 may be represented as 83, and the first user's understanding of C9 314 may be represented as 85.

Further, according to one embodiment of the invention, relationships of the plurality of concepts may be specified. For example, C1 311, C3 312, C8 313, and C9 314 may have a superordinate-subordinate relationship with the first unit 310, and may have an analogous relationship or a dependent relationship as the concepts that are necessary to accomplish the goal of the first unit 310.

Specifically, according to one embodiment of the invention, the first user's understanding of C1 311, C3 312, C8 313, and C9 314 may be calculated on the basis of the relationships between the concepts and the concept understanding estimated through the concept-specific understanding estimation model. More specifically, according to one embodiment of the invention, the first user's understanding may be determined by assigning weights to reference values of the concept understanding for C1 311, C3 312, C8 313, and C9 314 (e.g., values calculated by multiplying the concept understanding for C1 311, C3 312, C8 313, and C9 314 by 100) on the basis of the relationships of C1 311, C3 312, C8 313, and C9 314.

Next, according to one embodiment of the invention, the first user's understanding may be structurally visualized on the basis of the relationships between the concepts.

For example, according to one embodiment of the invention, the first user's understanding of the first unit 310, the second unit 320, and the learning course 301 may be diagrammatically represented on the basis of the relationships between the concepts included in each of the units.

Specifically, according to one embodiment of the invention, the first user's understanding of the first unit 310 may be visualized as a value calculated by averaging the first user's understanding of C1 311, C3 312, C8 313, and C9 314 included in the first unit 310. According to one embodiment of the invention, the first user's understanding of the second unit 320 may be visualized as a value calculated by averaging the first user's understanding of C2 312, C4 322, C5 323, and C6 324 included in the second unit 320. Further, the first user's understanding of the learning course 301 comprising the first unit 310 and the second unit 320 may be visualized as a value calculated by averaging the first user's understanding of the first unit 310 and the second unit 320. Here, it is noted that according to one embodiment of the invention, at least one of the plurality of concepts may include a concept that the first user has not encountered.

In this way, the concept understanding provision system 200 may provide a structural visualization of a user's understanding of courses, units, or concepts on the user's interface, thereby reminding the user of a course, unit, or concept that requires supplemental learning.

Referring to FIG. 4, according to one embodiment of the invention, the first user's understanding of each concept may be provided via a bar graph on the first user's interface. For example, a bar graph 410 according to one embodiment of the invention may represent a visualization of the first user's current understanding of each concept.

Next, according to one embodiment of the invention, in response to selecting a bar graph for a first concept, the first user's understanding of the first concept may be visualized over time.

For example, the first user's understanding of C9 may be represented by changes in the user's understanding from a first time point (e.g., January 2) to a $n^{th}$ time point (e.g., January 9) specified with respect to C9 via a curve graph 424 connecting the concept understanding at each time point (e.g., January 2, January 3, . . . , January 9). That is, according to one embodiment of the invention, when selecting a bar graph 414 for C9, the first user may dynamically identify the changes in the concept understanding for C9 over time.

In this way, the concept understanding provision system 200 may provide a visualization of a user's understanding of a specific concept over time so that the user may easily recognize the need of learning the specific concept, thereby increasing the efficiency of learning.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing information on a user's concept understanding, the method comprising the steps of:
   acquiring a set of data on a user's understanding of concepts including a first concept estimated using a concept-specific understanding estimation model that is trained on the basis of concept-specific correctness/incorrectness sequence data;
   estimating the user's understanding of a second concept not encountered by the user using a matrix factorization algorithm on the concept-specific correctness/incorrectness sequence data represented in a matrix structure with respect to the first concept and the second concept; and
   visualizing the user's understanding of the first concept included in the acquired data set and the second concept on a device of the user,
   wherein the concept-specific understanding estimation model is trained such that the understanding is estimated by assigning a greater weight to a piece of the concept-specific correctness/incorrectness sequence data generated at a later time point, on the basis of a weighting function as below:

$$w_{tl} = \frac{d^{t-l}}{\sum_{i=1}^{t-1} d^{t-i}} \in (0, 1]$$

where $w_{tl}$ denotes a weight assigned to a $l^{th}$ piece of the sequence data out oft pieces of the sequence data, and d denotes a user-defined constant.

2. The method of claim 1, wherein in the visualizing step, the user's understanding of a specific concept are specified at two or more time points, and the user's understanding at the two or more time points are visualized over time.

3. The method of claim 1, wherein in the visualizing step, a relationship between at least two concepts is specified, and the user's understanding of the at least two concepts are visualized on the basis of the relationship.

4. A non-transitory computer-readable recording medium having stored thereon a computer program for executing the method of claim 1.

5. A system for providing information on a user's understanding, the system comprising:
   a data acquisition unit configured to acquire a set of data on a user's understanding of concepts including a first concept estimated using a concept-specific understanding estimation model that is trained on the basis of concept-specific correctness/incorrectness sequence data,
   to estimate the user's understanding of a second concept not encountered by the user using a matrix factorization algorithm on the concept-specific correctness/incorrectness sequence data represented in a matrix structure with respect to the first concept and the second concept; and
   a concept understanding provision unit configured to visualize the user's understanding of the first concept included in the acquired data set and the second concept on a device of the user,
   wherein the concept-specific understanding estimation model is trained such that the concept understanding is estimated by assigning a greater weight to a piece of the concept-specific correctness/incorrectness sequence data generated at a later time point, on the basis of a weighting function as below:

$$w_{tl} = \frac{d^{t-l}}{\sum_{i=1}^{t-1} d^{t-i}} \in (0, 1]$$

where $w_{tl}$ denotes a weight assigned to a $l^{th}$ piece of the sequence data out oft pieces of the sequence data, and d denotes a user-defined constant.

6. The system of claim 5, wherein the concept understanding provision unit is configured to specify the user's understanding of a specific concept at two or more time points, and visualize the user's understanding at the two or more time points over time.

7. The system of claim 5, wherein the concept understanding provision unit is configured to specify a relationship between at least two concepts, and visualize the user's understanding of the at least two concepts on the basis of the relationship.

* * * * *